UNITED STATES PATENT OFFICE.

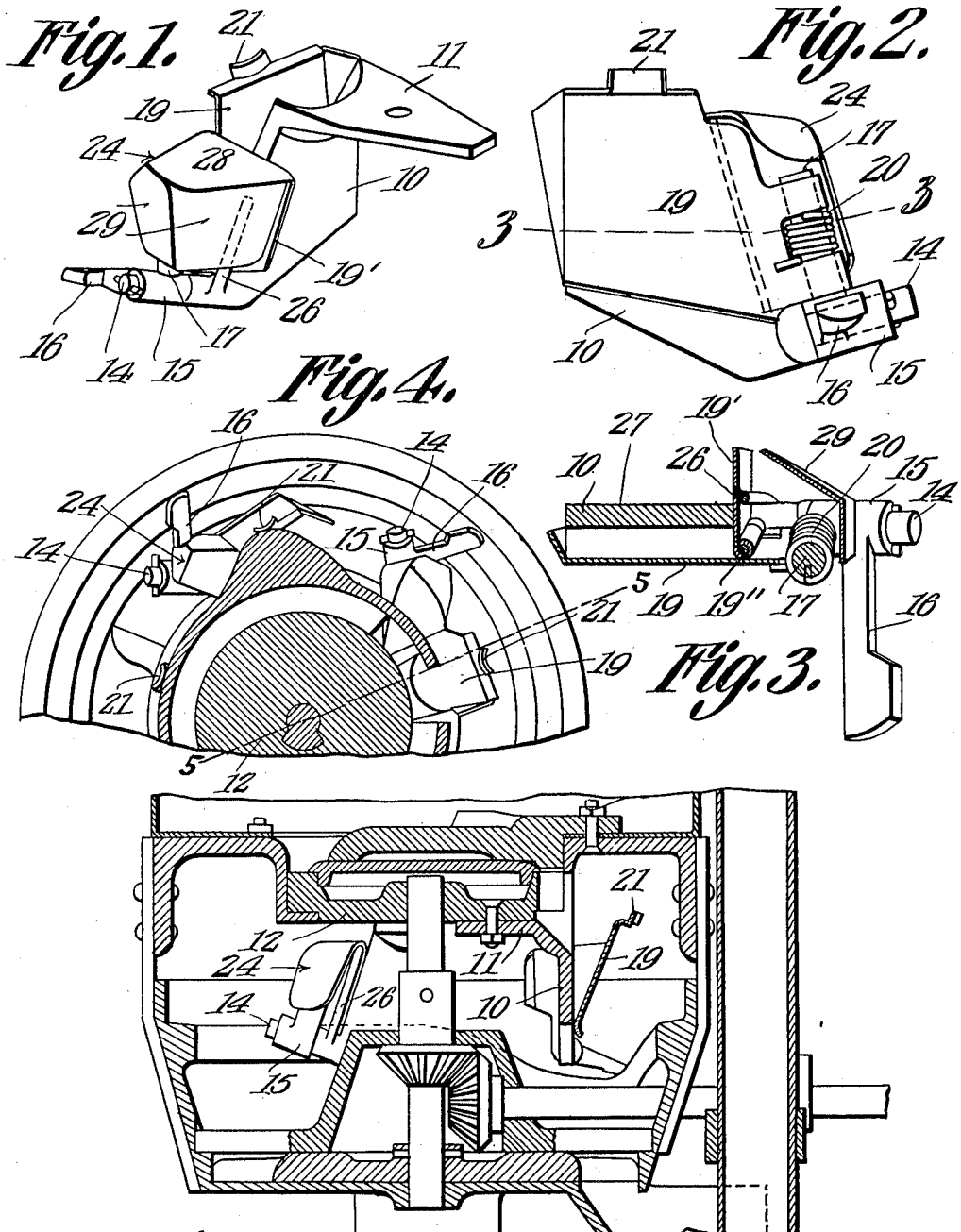

JOHN ALBERT ANDERSON, OF GENESEO, ILLINOIS.

SELECTOR FOR CORN-DROPPERS.

1,020,591.  Specification of Letters Patent.  Patented Mar. 19, 1912.

Application filed August 21, 1911. Serial No. 645,123.

*To all whom it may concern:*

Be it known that I, JOHN A. ANDERSON, a citizen of the United States, residing at Geneseo, in the county of Henry and State of Illinois, have invented a new and useful Selector for Corn-Droppers, of which the following is a specification.

This invention relates to an improvement in seed selecting mechanism for corn droppers and the present invention is an improvement on the selecting mechanism of Patent No. 911,691 of February 9, 1909.

The above mentioned patent provides a mechanism which receives a number of grains and which prior to the depositing of the same in a delivery chute separates the same, in such manner that a single grain will be deposited within said chute.

The selector consists of a backing plate provided at its lower end with a spindle. A sleeve is journaled upon the spindle, said sleeve being formed with a plurality of arms. Hingedly supported on one of said arms is a second plate which is mounted for movement so that the angle between its plane and the plane of the backing plate may be increased or diminished. The other arm which extends from said sleeve is arranged for contact with a cam to separate the plates in order to drop the grain, a transverse plate being secured to the spindle which supports the second mentioned plate, said plate coacting with the first mentioned plate to form a housing for the grain.

It has been found in practice when the grain is deposited within the selector that some of the grains will drop between the transverse plate and the arm which supports the plate, interfering with the opening and closing of the selector. The present invention provides means for protecting this joint and preventing the grain from interfering with the opening and closing of the selector.

In the drawings, Figure 1 is a perspective view of the selector equipped with the protecting hood. Fig. 2 is a side elevation of said selector. Fig. 3 is a section taken on the line 3—3 of Fig. 2. Fig. 4 is a view showing a portion of the seed distributing mechanism, and, Fig. 5 is a vertical diametrical section on the line 5—5 of Fig. 4.

In the drawings 10 designates the back plate which is provided with the angular extension 11 by means of which the selector is secured to the rotary disk 12 of the seed distributing mechanism. The plate 10 is formed with a spindle 14 and arranged on said spindle is a sleeve 15. Said sleeve is provided with a plurality of radially extending arms 16 and 17. Hingedly supported on the arm 17 is a plate 19, the coil spring 20 normally holding said plate in contact with the plate 10. The transverse plate 19′ is also hinged at 19″ on plate 19 having a sliding contact with the edge of plate 10. The plates 19, 19′ and 10 combine to form a pocket for the seed, the plate 19 being moved by means of the arm 16 which is cam actuated in order to allow a portion of the seed deposited in the pocket to fall within the receptacle, prior to the depositing of the seed which is to be planted, the seed which is to be planted being allowed to fall through the contact of a second cam or projection 21 arranged on the plate 19. This structure is with certain slight changes the same as that shown in the above mentioned patent.

It has been found in practice that when the grain is deposited within the pocket certain grains fall on the plate 19′, lodging between the same and the arm 17 which supports said plate and the plate 19 and when the cams operate to rotate the sleeve 15 on the spindle 14, these grains prevent the movement of the plates. In order to prevent the grain from falling on the plate 19′ said plate is provided with an overhanging extension or hood 24 preferably formed of a single piece of metal which is secured to the upper edge of the plate 19′. This hood completely covers the hinge joint at all times and is of such a configuration as to deflect the grain, preventing the same from remaining on the hood. In the present case, the transverse plate 19′ guided in its movement by the rod 26 which is secured to the spindle 14 and which lies parallel to the edge 27 of the plate 10. The hood 24 is formed with a sloping top portion 28 and the deflecting side walls 29, the hood effectually shedding the grain which is deposited on the same the connection between the plates being completely shielded. Attention is called to the fact that the hood is of such construction that the same may be readily secured to selecting devices as now manufactured the only change in the manufactured structure being the positioning of the guide rods 26.

What is claimed is:—

1. A seed selector comprising a back plate, an arm pivoted thereto, a plate hinged upon said arm and being held in engagement with the back plate under spring tension, and end plates transversely disposed with relation to the first mentioned plate and hingedly connected to one and slidably engaging the other, said transversely disposed plate being provided with an overhanging portion arranged to form a cover for the hinge joint of the first mentioned plate.

2. A seed selector comprising a back plate, an arm pivoted thereto, a plate hinged upon said arm and being held in engagement with the back under spring tension, an end plate transversely disposed with relation to the first mentioned plate and hingedly connected to one, and slidably engaging the other, and a hood secured to said transversely disposed plate, said hood extending outwardly and downwardly from its secured point.

3. A seed selector comprising a backing plate, an arm pivoted thereto, a plate hinged upon said arm and being held in engagement with the backing plate under spring tension, an end plate transversely disposed with relation to the first mentioned plate and hingedly connected to one and slidably engaging the other, and a hood secured to the upper edge of said transversely disposed plate, a rod supported by said backing plate, and arranged parallel with the edge portion of said plate, said transversely disposed plate being guided in its movement by said rod and a hood secured to the upper edge of said transversely disposed plate, said hood being formed with a sloping top portion and sloping side walls.

In testimony that I claim the foregoing as my own, I have hereto affixed my signature in the presence of two witnesses.

JOHN ALBERT ANDERSON.

Witnesses:
 CHAS. M. MORTON,
 C. L. NELSON.